United States Patent [19]

Heinz

[11] 4,373,404
[45] Feb. 15, 1983

[54] DIFFERENTIAL SCREW ACTUATOR

[75] Inventor: Theodore A. Heinz, Simi Valley, Calif.

[73] Assignee: Rockwell International Corporation, El Segundo, Calif.

[21] Appl. No.: 164,417

[22] Filed: Jun. 30, 1980

[51] Int. Cl.³ .............................................. F16H 1/18
[52] U.S. Cl. ............................ 74/424.8 B; 74/424.8 R
[58] Field of Search ............................. 350/289, 486; 74/424.8 R, 424.8 B; 192/94, 141

[56] References Cited

U.S. PATENT DOCUMENTS

| 3,029,660 | 4/1962 | Sears | 192/141 |
| 3,037,397 | 6/1962 | Allen et al. | 74/424.8 R |
| 3,277,736 | 10/1966 | Goodman | 192/141 X |
| 3,319,481 | 5/1967 | Goodman | 74/424.8 R |
| 3,326,054 | 6/1967 | Canick et al. | 192/141 |
| 3,727,471 | 4/1973 | Botos | 74/424.8 B |
| 4,060,314 | 11/1977 | Heinz | 350/289 |

*Primary Examiner*—Allan D. Herrmann
*Attorney, Agent, or Firm*—H. Fredrick Hamann; Harry B. Field

[57] ABSTRACT

A differential ball screw actuator permitting the rear ball nut to rotate with the screw over a limited range so that plates to be positioned are displaced and/or tilted in a direct pitch mode for a course adjustment while the differential pitch mode is used for fine or small adjustments only. The actuator can be used for tilting a laser mirror or other precision tilt and/or linear displacements.

8 Claims, 3 Drawing Figures

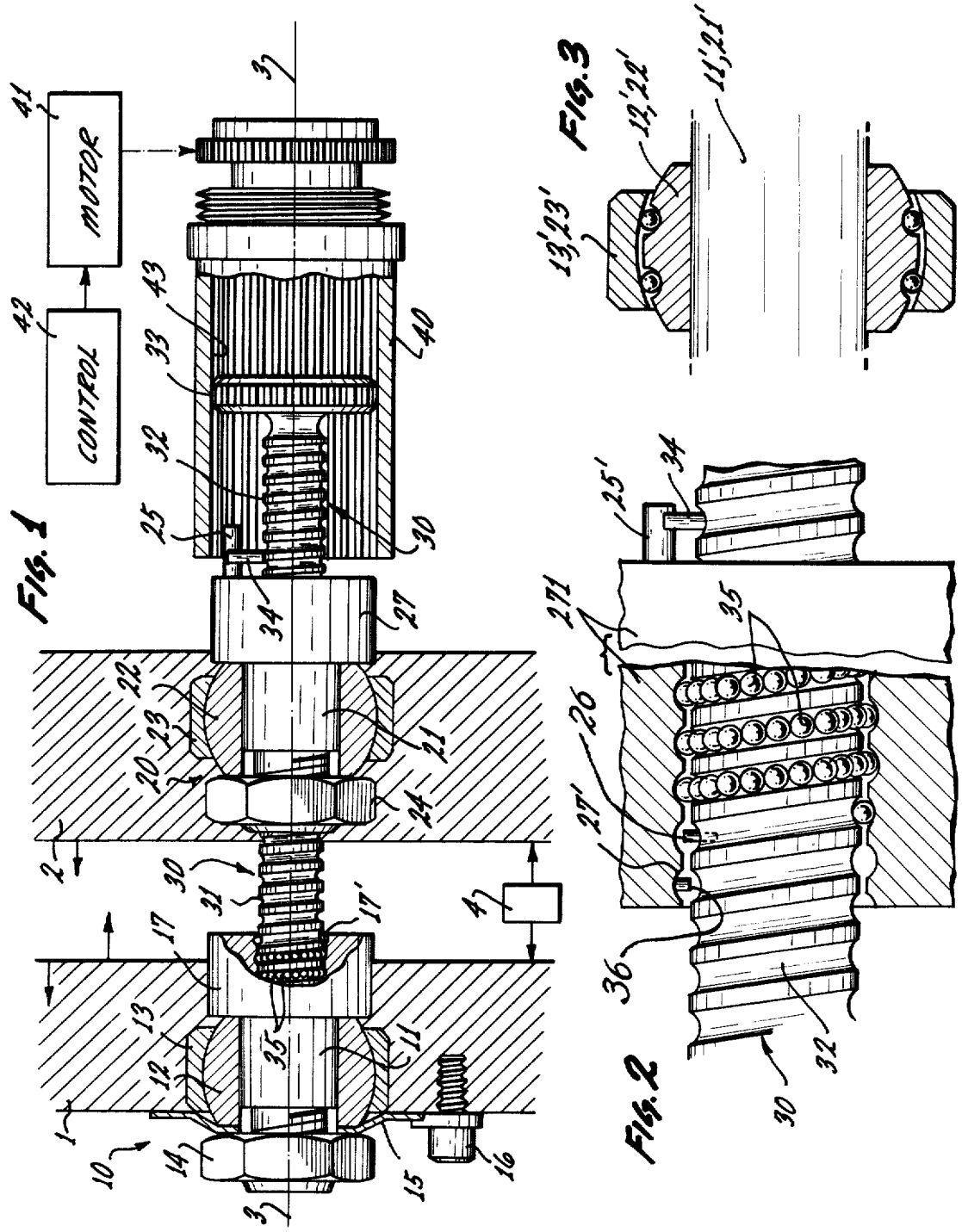

DIFFERENTIAL SCREW ACTUATOR

BACKGROUND OF THE INVENTION

The present invention relates to differential screw actuators; and more particularly, but not exclusively, the invention relates to improvements in ball-screw-actuating and operating mechanisms for a mirror mount, or the like, such as described in my U.S. Pat. No. 4,060,314, whose content is incorporated by reference. Broadly speaking, the invention relates to precision actuation, to obtain, provide, and retain small, very well defined positions and displacements.

The patent mentioned above discloses a structure for tipping and tilting a laser mirror. The terms TIP and TILT are used to differentiate among two different pivot motions about two intersecting axes in the plane of the mirror. The mirror is mounted directly to a backup plate which, in turn, is cantilevered to a support by means of flexure elements. Mirror and backup plate are tilted and tipped in relation to the support (while continued to be held by the flexure elements) by means of two so-called differential ball screw actuators Each actuator includes screws and two sets of bearing balls encapsulated within an enclosed continuous helical track at both ends. The helical track at one end has a pitch angle different from the helical track at the other end to provide differential movement between the two ends as the screw is rotated either clockwise or counter-clockwise. The ball bearings within the respective, enclosed continuous track are in compressional contact with the walls formed by the respective, enclosed continuous track, the compressional force being supplied by the flexure elements between the backup plate and the fixed support. The combined deflection of both ball and contact surface of the walls averages out any error introduced between the multiplicity of balls which provides an adjustment precision of the backup plate with respect to the fixed support of about $0.5$ in. $\times 10^{-6}$ in. or better. Positioning of the backup plate is achieved by driving each of the two differential screw actuators with stepping motors with back-lash compensation, making it possible to accurately position the mirror. The differential ball screw in combination with gear reduction provides, for example, less than one micro-inch of mirror movement per step of actuator motion. The actuators are locked in place by the detent action of the stepping motors with or without the fields energized, thus eliminating mirror misalignment which often occurs during locking of conventional mounts when set screws or the like are manually tightened. The ability of the device to retain a particular adjusted position and the overall stability are significant advantages of this device.

It can readily be seen that the precision of actuation by such a ball screw actuator depends to some extent upon the actual difference in pitch of the front and rear parts of the screw. The smaller that difference, the greater the precision. This, however, entails a longer screw to provide the required actuated stroke. One needs, therefore, deep envelopes receiving long screws. Since such a screw may have to be several feet long, correspondingly long envelopes may simply not be available. Moreover, long screws and deep envelopes are expensive because, in each instance, precision must be maintained for great lengths.

DESCRIPTION OF THE INVENTION

It is an object of the present invention to provide a new and improved differential screw actuator in which a shorter screw can be used.

It is another object of the present invention to provide a new and improved differential screw actuator, particularly a ball screw actuator, having a significantly enlarged range of adjustment.

It is a particular object of the present invention to improve precision adjustment of optical elements such as laser mirrors, but also for use in machine tables, tracking equipment, and other devices in which attainment and retention of accurate positions and/or orientation angles is required.

It is a specific object of the present invention to improve differential screw actuators in which a first and a second plate or plate-like element have each a bearing and/or mounting element which includes a nut and is traversed by a common actuator screw having different pitches in different portions, the screw thread and the nut threads being coupled either directly by threaded engagement, or preferably, by bearing balls so that the screw can be threaded through.

In accordance with the preferred embodiment of the present invention, it is suggested to fix one nut relative to the respective plate, so that the screw, upon turning, advances always axially relative to that particular nut. As far as the other nut is concerned, the screw is coupled thereto for common rotation over a certain range, while being decoupled therefrom for an adjoining range to permit relative axial advancement. Whenever the screw is coupled to the last-mentioned nut, the plates or plate-like elements are shifted apart or toward each other, at a high rate as directly determined by the pitch of the single screw and nut, the nut being always prevented from turning; whenever the screw is threaded through both nuts, both not rotating accordingly, displacement of the plates relative to each other depends on the pitch differential. Thus, the operating range is drastically increased and/or the length requirements for the screw are drastically reduced because, for most of a relatively large adjustment, only one nut is held to advance the screw directly in accordance with its pitch. This adjustment is relatively coarse, but is always succeeded by fine adjustment in the differential mode, covering just a small range which is sufficient in order to attain the requisite accuracy and precision.

In the preferred form, a pair of coupler pins is provided, one on the screw, the other one on the one nut. Whenever the pins engage, the nut will rotate with the screw. Upon disengagement of the pins, the screw will be threaded through the nut. As long as the pins are coupled for common rotation, the local spacing of the plates is adjusted in a coarse or direct mode. If the threaded portion of the screw engaging the particular nut being always prevented from turning, has a pitch that is smaller than the pitch of the other portion of the screw, the screw drive being a step motor, will always overdrive a little bit, whereupon the motor reverses, the pins disengage, and the final position is attained by the precision of the differential pitch mode and operation. Alternatively, if the pitch of that portion of the screw engaging the permanently immobilized nut is larger than the pitch of the screw portion engaging the selectively immobilized nut, one will not overshoot, but stop short of the final position. Now, the motor is reversed, causing the pins to disengage; and the operation continues in the fine-positioning, differential pitch mode, causing the plates to directly home in on the final position without having to overshoot. In either case, position adjustment is first carried out by a short stroke, coarse mode, followed by motor reversal in order to obtain the fine mode. Stroke length is determined by pitch, pitch differential, and stop pin positions. The total stroke length of this type of adjusting device is no longer determined by the differential lead, being the differential pitch of the two nuts and screw portions. Rather, the pitch of the permanently held nut determines the (maximum) stroke and length of the screw. The differential pitch and lead is used only for final precision adjustment.

The invention can be practiced in relatively simple devices in which, for example, the plates are just moved relative to each other, and wherein neither tilting nor the taking-up of gravitational forces of the screw, due to cantilever suspension, is required. The screw may just be regularly threaded in the nuts. However, a mount for a laser mirror is usually cantilevered from a support. In this case, compressed balls should be used for threadedly coupling the screw threads to the nut threads, the compression resulting from flexure elements acting between the plates as described in my patent mentioned above. Moreover, the adjustment of such a mirror is a tilt or tip adjustment, so that swivel bearings are required to permit angular displacement of the shaft's axis relative to the plates, or of at least one of them. The using of multiple, compressed balls for coupling the nuts to the screw prevents drive backlash and other slack to deteriorate accuracy. The position attained in a very precise manner is retained with certainty. Application of the principle of selectively holding one of the two ball nuts in each actuator permits drastic shortening of the respective actuator screw.

The preferred embodiment of the invention, the objects and features of the invention, and further objects, features and advantages thereof, will be better understood from the following description taken in connection with the accompanying drawings.

DESCRIPTION OF THE DRAWINGS

FIG. 1 is a side view, partially in section, of a ball screw actuator, in accordance with the preferred embodiment of the invention, constituting the best mode of practicing same;

FIG. 2 illustrates a modification for one of the ball nuts used in FIG. 1; and

FIG. 3 illustrates a further modification of the screw-guiding portion in such an actuator.

Proceeding now to the detailed description of the drawings, the actuator as shown and to be described is provided to obtain very precise displacements and relative positions between a first plate 1 and a second plate 2. The two plates are provided with apertures in the general sense, and these two apertures are aligned along an axis 3. The apertures are traversed by a shaft 30 whose axis coincides with axis 3. Shaft 30 is provided with two sets of threads, a front thread 31 and an aft thread 32. These two threads have slightly different pitches to obtain differential action. The rear end of shaft 30 carries a gear 33 which meshes a long, internal gear 43 of a sleeve 40. Together, gears 33 and 43 constitute a spline drive, permitting shaft 30 to move axially, relative to sleeve 40, but following the rotation thereof.

As indicated schematically, sleeve 40 is geared to a drive 41, being, for example, a stepping motor, or the like. Motor 41 may be controlled by a circuit 42 which meters operating pulses to step the motor and drive from one position to the next one, imparting thereby rotational or angular turning steps upon shaft 30. The motor may, for example, operate at a rate of 300 steps per second and device 42 counts these pulses for issuance. These turning steps are translated into axial displacements of plates 1 and 2 relative to each other, as will be described next.

Shaft 30 traverses, in particular, a front assembly 10 and a rear assembly 20 in and of the two plates 1 and 2. The front assembly is comprised of a sleeve 11 held in ball elements 12 of a first swivel joint, being received in a spherical sprocket 13 which is suitably affixed in the bore of plate 1. Sleeve 11 serves as a guide element for shaft 30 and is axially retained by a nut 14. Nut 14 in particular locks a washer 15 against ball element 12 as well as against plate 1. A lock screw 16 ties the washer directly to plate 1.

Washer 15 acts as a torque restraint, i.e., it prevents ball 12 from rotating about axis 3. The construction of washer 15 can be taken by way of example from FIG. 8 of my U.S. Pat. No. 4,060,314.

Element 17 can be described as a first or forward ball nut and is integral with sleeve 11. The nut has a helical thread 17', serving as a race for a bearing because it contains a plurality of bearing balls 35. These balls are retained and encapsulated in thread 17' and run in thread 31 of shaft 30 to the extent that the thread traverses nut 17. Particularly, recirculating tubes or passages (not shown) pick up and transfer the balls from the end race to the starting race, retaining the balls within nut 17. The balls 35 are in compressed contact with the walls of threads and races 17' and 31. The compression force is supplied by an element 4, being only schematically indicated. Generally speaking, a force is presumed to act upon the plates by tending to spread them apart. A flexure element may be provided for that purpose, if, for example, plate 1 is cantilevered from plate 2. Such a flexure element is shown by way of example in FIG. 7 of my patent mentioned above.

The shaft 30 is actuated at large design preloads, which create large ball and contact surface strains. The combined deflection of both balls 35 and contact surfaces 17' and 31 is many times (100 times to 1000 times) greater than the adjustment precision required (on the order of $1 \times 10^{-6}$ in.). Since this deflection is also many times larger than imperfections of machined surfaces of, for example, the surface of the balls and the surface of the continuous track 17', the precision is significant, particularly, if compared with regular and direct threaded engagement between the nut and the screw threads.

It should be noted further that a spherical bearing-type swivel joint 12/13 is needed only if the shaft may undergo lateral tilting deflections relative to plate 1. Otherwise, sleeve 11 and nut 17 could be directly affixed to plate 1, obviating the need for further retention.

The rear assembly 20 for plate 2 includes also a sleeve 21, holding a spherical bearing element 22 which, in turn, is received by a spherical socket element 23 to provide a second swivel joint. A nut 24 holds the sleeve axially against ball element 22; but there is no washer interposed. Thus, the ball-shaped joint element 22 is not directly prevented from turning about axis 3. If lateral tilting deflection of shaft 30 does not have to be provided for, joint 22/23 can be replaced by regular bearings, permitting merely rotation of sleeve 21 about an axis normal to plate 2.

A second or aft ball nut 27 is, basically, of similar construction as nut 17 and is integral with sleeve 21. There are also ball elements 35 retained in a thread-like race and in the screw threads 32. The balls are compressed by the same force and action that compresses balls 35 in nut 17. The differential motion comes about by a pitch difference in the threaded engagement and coupling between nuts 17 and 27 on the one hand and the different thread portions (31, 32) of shaft 30 on the other hand. Nut 27 is not prevented from rotation as is nut 17 (by operation of washer 15). However, the force exerted by device 4 against plates 1 and 2, and compressing the balls exerts an axial force upon nut 27 holding it to some extent against rotation when shaft 30 turns. This holding force, however, which is augmented by friction in bearing 22/23, can be overcome, as described next.

A pin 25 extends axially from nut element 27, which pin may abut against a pin 34, extenting radially from shaft 30. Thus, shaft 30 may rotate relative to nut 27 by almost one revolution (i.e., by one revolution, reduced by the angular width of pin 25). Upon further rotation of shaft 30, abutment of pins 25–34 serves as a coupling, causing nut 27 and ball 22 to follow that rotation. Whenever nut 27 is forced in this fashion to follow the rotation of shaft 30, shaft 30 cannot axially advance in relation to plate 2. At the same time, shaft 30 does axially advance relative to plate 1, because of its threaded engagement with and relative turning in relation to nut 17. Thus, plate 1 will be moved relative to plate 2 at a rate depending directly upon the pitch of thread 31. Nut 27 does not participate in this advance.

The displacement of the plates with a nut being stationary is called "direct pitch mode." On the other hand, whenever shaft 30 is permitted to also turn in and relative to nut 27, the relative axial displacement between plates 1 and 2 depends upon the pitch difference and is called the "differential mode" or "differential lead" of the screw. The range for the differential mode is limited to (almost) one turn of the shaft 30; but that relatively small range is all that may be needed. The range of the "differential mode" may be changed, if desired, by simply repositioning the pins.

In operation, shaft 30 will begin to turn from a given position which, more likely than not, is not one in which the pins 25/34 abut. Thus, any motion begins with a differential mode operation. That part can already be calculated and considered a portion of the fine range of the requisite adjustment. Upon abutment of pins 25/34, this first portion of the differential mode is terminated, and plates 1 and 2 are spread apart in the direct pitch mode up to a particular position. If one assumes that the pitch of thread portion 31 is smaller than the pitch of thread portion 32, the position in which the direct pitch or coarse mode terminates, must be, in terms of screw rotation and differential pitch, a less than one-turn overshoot. Next, shaft 30 is slightly turned in the reverse direction, to home in on the final position, but now in the high precision, differential mode. The pins will disengage and nut 27 will stop on account of friction in the ball and socket joint 22/23; but shaft 30 turns so that the differential mode is reentered accordingly. Alternatively, the pitch of helical race 31 may be larger than the pitch of helical race 32. In this case, the direct and coarse mode is terminated before the final position is reached; and upon reversing the rotation of motor 41, the direction of continued relative displacement between plates 1 and 2 will be the same as in the coarse mode, even though the motor has reversed; but that displacement is now also in the fine mode.

This actuator constitutes a significant improvement because the maximum stroke is primarily determined by the pitch and range of the forward nut 17 alone, and not by the differential range. Since the pitch of the forward nut may be ten or more times the differential lead (pitch difference), the length of the screw required for a given stroke is drastically reduced.

A first field of application of the invention is the field of positioning a laser mirror requiring microinch precision of positioning. In such an instance, plate 1 is the backup and support plate for the mirror, and plate 2 is part of the stationary mounting structure. Mirror mounting and positioning devices may be constructed as shown in my U.S. Pat. No. 4,060,314; but two inventive devices replace the two ball screw actuators, identified by numeral 16 in that patent. A device for establishing the fulcrum point for tipping and tilting the mirror can be the same as shown in FIG. 6 of that patent. The same holds true with respect to the overall organization and construction, except that the lengths of the actuator screws are significantly reduced, or the adjustment range is correspondingly enlarged by the particular differential ball screw actuator, as per the present invention.

For example, a laser mirror tilt and tip operation may require about $\pm \frac{1}{8}$ of an inch of maximum total displacement, at a one-microinch resolution. At a less then 10-percent pitch difference and a front nut pitch of 0.062 inch per resolution, a screw operating exclusively in the differential mode would have to be 35 inches long. The envelope would have to be similarly long. Such a long screw and envelope would be outright impractical and it would increase the differential lead, and the components would require a higher degree of precision. Using the principle outlined above permits a reduction in screw length to 2 inches. A still better resolution is possible, of course, because such a screw is easier to make, and at a considerable reduction in cost.

An added benefit is the reduction in operating times. The number of shaft turns needed to obtain a particular displacement is drastically reduced because in the direct pitch mode the axial displacement per shaft turn is, e.g., ten times as large as in the differential mode. So, a given stroke is traversed at a considerably shorter time span.

FIG. 2 illustrates a modifying refinement. A portion of the threads 27' in nut 271 is not occupied by balls, but the nut has an inwardly extending pin 26, cooperating with another pin, 36, on shaft 30. Moreover, pin 25' is relatively short so that after one revolution of shaft 30, out of a position of abutment of pins 25'/34, pin 34 clears pin 25'. In other words, the coupling of shaft 30 to nut 271 by means of these pins is effective only in one direction. As far as the opposite direction is concerned, pins 26/36 engage after more than one revolution of shaft 30, taken from a position of engagement of pins 25 and 34. Thus, shaft 30 can turn relative to nut 271 for more than one revolution, depending upon the axial and relative azimuthal spacing between the various pin sets. Accordingly, the differential mode range is enlarged.

FIG. 3 illustrates a modification for the swivel points. One may use the illustrated ball bearings 12', 13', or 22', 23', being of the swivel- and thrust-type instead of simple ball and socket joints, in order to reduce friction on swivel action in the plane of the drawing. Upon using such low friction bearings, their residual friction may be too low. Theoretically, large bearings require more torque than smaller bearings; still, it may be desirable to impose a friction device, or override-type of releasable precision brake means to prevent the nuts from rotation about axis 3, particularly, when nut 27 is decoupled from the shaft. The shaft rotation must, however, readily overcome any such retarding force when the pins engage for coupling. Further refinements include an electrically operated, collet-type lock to secure the actuator in a severe vibration environment.

The invention can also be used in an environment requiring only linear displacement. In this case, nut 17 and guide sleeve 11 can be secured to plate 1, or the like, while cylindrical bearings, or roller bearings, support sleeve 21 and nut 27 in part 2.

The invention is not limited to the embodiments described above; but all changes and modifications thereof, not constituting departures from the spirit and scope of the invention are intended to be included.

I claim:

1. In a differential actuator for precision adjustment of spacing between a first and a second plate under utilization of a screw, there being first threaded means in said first plate and second threaded means in said second plate having different pitches, the screw threadedly engaging the first and second threaded means, the improvement comprising in combination first means for preventing rotation of the first threaded means during rotation and feedthrough of the screw; and second means for preventing rotation of the second threaded means for and over a particular range only, while permitting rotation of the second threaded means with the screw in an adjoining range of rotational displacement of the screw, so that the spacing is coarsely adjusted by direct screw action of the screw in the first threaded means, and finely adjusted by differential screw action when rotation of the second threaded means is prevented.

2. In a differential actuator for precision adjustment of spacing between a first and a second plate under utilization of a screw, there being first threaded means in the first plate and second threaded means in said second plate having different pitches, the screw threadedly engaging the first and second threaded means, the improvement comprising in combination first means for preventing rotation of the first threaded means during rotation and feedthrough of the screw; and second means for coupling the screw to the second threaded means for common rotation over a particular range of angular displacement of the screw, causing the screw to be decoupled from the second threaded means in an adjoining rate so that said spacing is coarsely adjusted by direct screw action of the screw in the first threaded means, and finely adjusted by differential screw action when rotation of the second threaded means is prevented.

3. An actuator as in claim 1 or 2, wherein each of the threaded means is coupled to the screw by means of compressed balls.

4. An actuator as in claim 2, the second means including a pin on the second bearing means and a pin on the screw, the pins engaging each other to obtain coupling and being disengaged from each other for the differential screw action.

5. In a ball screw actuator, a nut element having an internal, helical race;
  a screw element traversing the nut element, there being balls under compression retained in the thread and the race to permit the screw element to be threaded through the nut element and being capable of retaining the relative position of the elements, the improvement comprising:
  means for coupling the nut element to the screw element for a range of rotation of the screw element, while decoupling the elements from each other for an adjoining range of rotations permitting the screw element to axially advance in the nut element; and
  means for frictionally preventing rotation of the nut element when the nut element is decoupled from the screw.

6. A differential ball screw actuator, for precision adjustment of a local spacing and tilting between a first plate and a second plate, comprising:
  a first bearing element mounted in the first plate to permit swiveling the second element having a bore aligned with the bore in the first element;
  a second bearing element mounted in the second plate to permit rotation and swiveling, the second element having a bore aligned with the bore in the first element;
  a first and a second nut respectively connected to the first and second bearing elements but having differing pitches;
  a screw having also different pitches in different portions, the screw traversing said nuts, there being compressed balls for coupling the screw to the nuts; and
  coupling means coupling the second nut to the screw for a certain range of rotational movement of the screw so that upon rotating the screw, it is threaded only through the first nut, thereby coarsely changing the spacing and tilt between the plates, while, upon decoupling, the screw also threads through the then not rotating second nut in order to obtain a further change in the spacing tilt by differential action only.

7. An actuator as in claim 6, the means for coupling being pins respectively extending from the screw and the nut element to engage for coupling and to disengage for decoupling.

8. An actuator as in claim 6, the means for coupling including two sets of pins to permit decoupling of the screw from the second nut or nut element for a limited number of turns only.

* * * * *